(12) United States Patent
Wang et al.

(10) Patent No.: US 11,718,752 B2
(45) Date of Patent: Aug. 8, 2023

(54) RESIN COMPOSITION AND ARTICLE MADE THEREFROM

(71) Applicant: Elite Electronic Material (KunShan) Co., Ltd., Kunshan (CN)

(72) Inventors: Rongtao Wang, Kunshan (CN); Ningning Jia, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 206 days.

(21) Appl. No.: 17/362,525

(22) Filed: Jun. 29, 2021

(65) Prior Publication Data

US 2022/0348766 A1 Nov. 3, 2022

(30) Foreign Application Priority Data

Apr. 27, 2021 (CN) .......................... 202110460491.8

(51) Int. Cl.
*C08L 71/12* (2006.01)
*C08J 5/24* (2006.01)
*B32B 5/02* (2006.01)
*B32B 15/20* (2006.01)
*B32B 15/14* (2006.01)
*B32B 5/26* (2006.01)

(52) U.S. Cl.
CPC .............. *C08L 71/126* (2013.01); *B32B 5/02* (2013.01); *B32B 5/26* (2013.01); *B32B 15/14* (2013.01); *B32B 15/20* (2013.01); *C08J 5/244* (2021.05); *B32B 2260/021* (2013.01); *B32B 2260/046* (2013.01); *B32B 2262/101* (2013.01); *B32B 2307/204* (2013.01); *C08J 2371/12* (2013.01); *C08J 2447/00* (2013.01); *C08J 2453/02* (2013.01)

(58) Field of Classification Search
None
See application file for complete search history.

(56) References Cited

U.S. PATENT DOCUMENTS

2021/0269637 A1* 9/2021 Chang ...................... C08J 5/244

* cited by examiner

*Primary Examiner* — Michael J Feely
(74) *Attorney, Agent, or Firm* — Muncy, Geissler, Olds & Lowe, P.C.

(57) ABSTRACT

A resin composition includes an unsaturated C=C double bond-containing polyphenylene ether resin, a polyolefin and silica; in an X-ray diffraction analysis pattern of the silica as measured by reference to JY/T 009-1996, only one diffraction peak exists in a 2θ ranging from 10° to 30°, and the diffraction peak has a full width at half maximum of 5.0° to 7.7°. The resin composition may be used to make various articles, such as a prepreg, a resin film, a laminate or a printed circuit board, and achieves improvements in at least one of the properties including dissipation factor, resin filling property in open area, hole drilling limit value, and precision of hole position Cpk.

12 Claims, 1 Drawing Sheet

RESIN COMPOSITION AND ARTICLE MADE THEREFROM

CROSS-REFERENCE TO RELATED APPLICATION

This application claims the priority benefits of China Patent Application No. 202110460491.8, filed on Apr. 27, 2021. The entirety the above-mentioned patent application is hereby incorporated by reference herein and made a part of this specification.

BACKGROUND

1. Field of the Disclosure

The present disclosure relates to a resin composition and an article made therefrom and more particularly to a resin composition useful for preparing an article such as a prepreg, a resin film, a laminate or a printed circuit board.

2. Description of Related Art

With the advent of the 5G generation, technology upgrade of printed circuit boards for mobile communication and automobile electronics requires the fundamental insulation materials in printed circuit boards to achieve not only high thermal resistance, high dimensional stability and low dielectric properties but also excellent filling property and drilling processability, so as to meet the processability requirements of printed circuit boards involving multiple lamination processes and multiple assembly operations.

Conventionally, to achieve high thermal resistance and high dimensional stability, resin compositions containing silica fillers were usually used to make laminates and printed circuit boards; however, these conventional resin compositions containing ordinary silica fillers fail to meet the growing demands of low dielectric properties and excellent drilling processability and resin filling property.

SUMMARY

To solve the above-mentioned problems, the present disclosure provides a resin composition, comprising:
(A) 100 parts by weight of an unsaturated C=C double bond-containing polyphenylene ether resin;
(B) 10 parts by weight to 50 parts by weight of a polyolefin; and
(C) 50 parts by weight to 130 parts by weight of silica, wherein, in an X-ray diffraction analysis pattern as measured by reference to JY/T 009-1996 of the silica, only one diffraction peak exists in a 2θ ranging from 10° to 30°, and the diffraction peak has a full width at half maximum (FWHM) of 5.0° to 7.7°.

The unsaturated C=C double bond-containing polyphenylene ether resin used herein is not particularly limited and may comprise various unsaturated C=C double bond-containing polyphenylene ether resins known in the art to which this disclosure pertains, such as but not limited to a vinylbenzyl-containing polyphenylene ether resin, a (meth)acryloyl-containing polyphenylene ether resin, a vinyl-containing polyphenylene ether resin or a combination thereof.

The polyolefin used herein is not particularly limited and may comprise various olefin polymers known in the art to which this disclosure pertains, such as but not limited to polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

Moreover, the resin composition may further optionally comprise (D) 5 parts by weight to 15 parts by weight of an unsaturated C=C double bond-containing crosslinking agent.

The unsaturated C=C double bond-containing crosslinking agent used herein is not particularly limited and may comprise, such as but not limited to, 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

Moreover, the resin composition may further optionally comprise maleimide resin, benzoxazine resin, epoxy resin, organic silicone resin, cyanate ester resin, active ester, phenolic resin, amine curing agent, polyamide, polyimide or a combination thereof.

Moreover, the resin composition may further optionally comprise flame retardant, curing accelerator, polymerization inhibitor, solvent, silane coupling agent, surfactant, coloring agent, toughening agent or a combination thereof.

The resin compositions of various embodiments may be useful for making different articles, including but not limited to a prepreg, a resin film, a laminate or a printed circuit board.

In a preferred embodiment, articles made from the resin composition disclosed herein have one, more or all of the following properties:
  in one embodiment, a dissipation factor at 10 GHz as measured by reference to JIS C2565 of less than or equal to 0.0039;
  in one embodiment, absence of void in an open area as observed from a resin filling property test of the open area;
  in one embodiment, a hole drilling limit value as measured from a drilling capability test of greater than or equal to 10000; and
  in one embodiment, a precision of hole position Cpk as measured from a drilling precision test of greater than or equal to 1.33.

DESCRIPTION OF THE EMBODIMENTS

Figure 1:
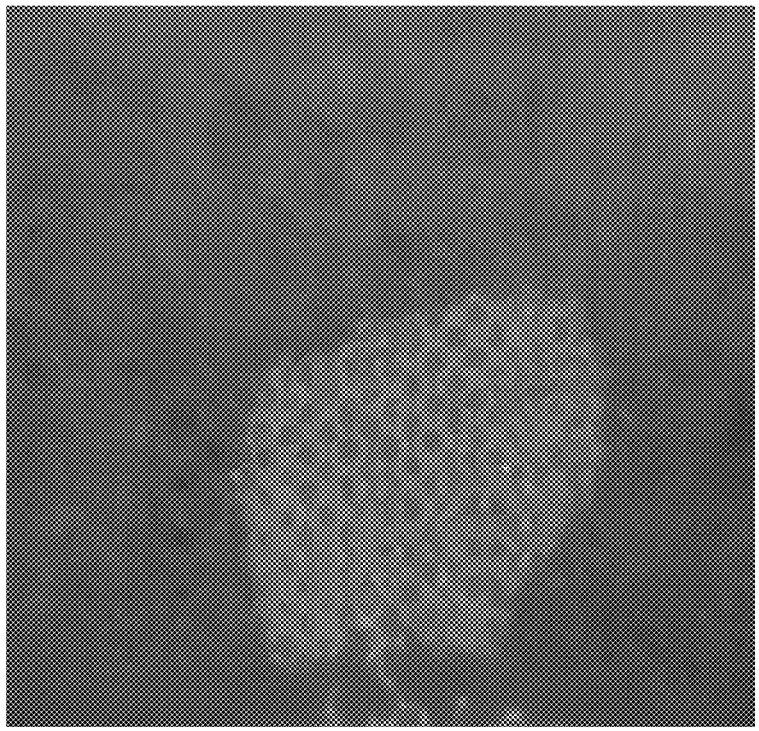
FIG. 1 illustrates the void in the open area.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. Copolymers comprise: random copolymers, such as a structure of -AA-BABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. A prepolymer refers to a polymer having a lower molecular weight between the molecular weight of monomer and the molecular weight of final polymer. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer.

Unless otherwise specified, the term "resin" of the present disclosure is a widely used common name of a synthetic polymer and is construed as comprising monomer and its combination, polymer and its combination or a combination of monomer and its polymer, but not limited thereto.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C═C double bond with the potential of being crosslinked with other functional groups, but not limited thereto.

The unsaturated C═C double bond as used herein preferably comprises, but not limited to, a vinyl group, a vinylbenzyl group, a (meth)acryloyl group, an allyl group or a combination thereof. The term "vinyl group" is construed as comprising a vinyl group and a vinylene group. The term "(meth)acryloyl group" is construed as comprising an acryloyl group and a methacryloyl group.

As used herein, D90 refers to the particle size of a silica sample when the cumulative volume percentage reaches 90%, which has a physical meaning that 90% of silica particles have a particle size of less than or equal to the particle size.

Unless otherwise specified, as used herein, part(s) by weight represents weight part(s) in any weight unit, such as but not limited to kilogram, gram, pound and so on. For example, 100 parts by weight of an unsaturated C═C double bond-containing polyphenylene ether resin may represent 100 kilograms of the unsaturated C═C double bond-containing polyphenylene ether resin or 100 pounds of the unsaturated C═C double bond-containing polyphenylene ether resin.

It should be understood that all features disclosed herein may be combined in any way to constitute the solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

For example, the present disclosure provides a resin composition, based on 100 parts by weight of an unsaturated C═C double bond-containing polyphenylene ether resin, the resin composition comprising:
  (A) 100 parts by weight of the unsaturated C═C double bond-containing polyphenylene ether resin;
  (B) 10 parts by weight to 50 parts by weight of a polyolefin; and
  (C) 50 parts by weight to 130 parts by weight of silica, wherein, in an X-ray diffraction analysis pattern as measured by reference to JY/T 009-1996 of the silica, only one diffraction peak exists in a 2θ ranging from 10° to 30°, and the diffraction peak has a full width at half maximum of 5.0° to 7.7°.

The unsaturated C═C double bond-containing polyphenylene ether resin used in the present disclosure is not particularly limited and may include any one or more unsaturated C═C double bond-containing polyphenylene ether resins useful for making a prepreg, a resin film, a laminate, or a printed circuit board, such as any one or more commercial products, products prepared by the applicant or a combination thereof.

The unsaturated C═C double bond-containing polyphenylene ether resin of the present disclosure has an unsaturated C═C double bond and a phenylene ether skeleton, wherein the unsaturated C═C double bond is a reactive group which may perform self-polymerization under heat and may also perform free radical polymerization with other components containing an unsaturated bond in the resin composition and finally result in crosslinking and curing. The cured product thereof has high thermal resistance and low dielectric properties. Preferably, the unsaturated C═C double bond-containing polyphenylene ether resin comprises an unsaturated C═C double bond-containing polyphenylene ether resin with 2,6-dimethyl substitution in its phenylene ether skeleton, wherein the methyl groups form steric hindrance to prevent the oxygen atom of the ether group from forming a hydrogen bond or Van der Waals force to absorb moisture, thereby achieving lower dielectric properties.

Generally, the unsaturated C═C double bond-containing polyphenylene ether suitable for the present disclosure may have a structure of Formula (1):

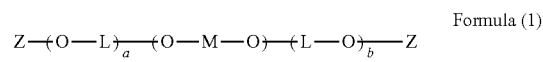

Formula (1)

wherein a and b are individually a positive integer of 1 to 30, preferably a positive integer of 1 to 10, and more preferably a positive integer of 1 to 5; —(O-M-O)— has a structure of Formula (2) or Formula (3):

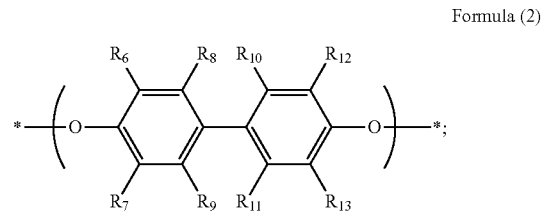

Formula (2)

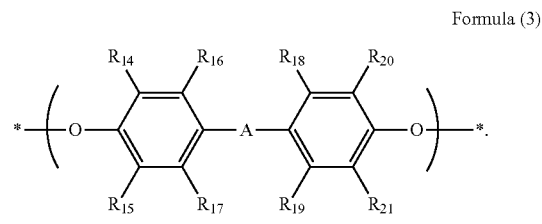

Formula (3)

L has a structure of Formula (4):

Formula (4)

wherein $R_6$, $R_7$, $R_{12}$ and $R_{13}$ are the same or different and are individually a halogen atom, a C1-C6 alkyl group or a phenyl group; $R_8$, $R_9$, $R_{10}$ and $R_{11}$ are the same or different and are individually a hydrogen atom, a halogen atom, a C1-C6 alkyl group or a phenyl group; in some embodiments, $R_6$, $R_7$, $R_8$, $R_{11}$, $R_{12}$ and $R_{13}$ are individually a methyl group; $R_{14}$, $R_{15}$, $R_{16}$, $R_{17}$, $R_{18}$, $R_{19}$, $R_{20}$ and $R_{21}$ are the same or different and are individually a halogen atom, a C1-C6 alkyl group, a phenyl group or a hydrogen atom; in some embodiments, $R_{14}$, $R_{15}$, $R_{20}$ and $R_{21}$ are individually a methyl group;

A is a C1-C20 straight chain hydrocarbyl group, a C1-C20 branched chain hydrocarbyl group (e.g., alkyl group) or a C3-C20 cyclic hydrocarbyl group (e.g., cycloalkyl group), preferably —$CH_2$— or —$C(CH_3)_2$—;

$R_{22}$, $R_{23}$, $R_{24}$ and $R_{25}$ are the same or different and are individually a hydrogen atom, a halogen atom, a C1-C6 alkyl group or a phenyl group, preferably individually a hydrogen atom or —$CH_3$;

Z has a structure of Formula (5), Formula (6) or Formula (7):

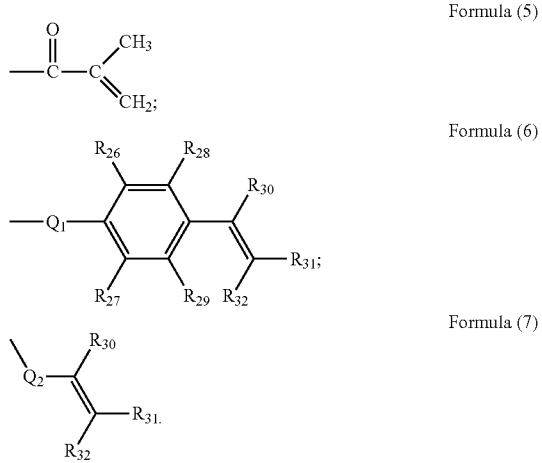

Wherein $R_{31}$ and $R_{32}$ are a hydrogen atom, $R_{26}$, $R_{27}$, $R_{28}$, $R_{29}$ and $R_{30}$ are the same or different and are individually a hydrogen atom, a halogen atom, an alkyl group or a haloalkyl group, wherein the alkyl group or haloalkyl group preferably is a C1-C6 alkyl group or a halogen-substituted C1-C6 alkyl group; $Q_1$ and $Q_2$ are individually an organic group with at least one carbon atom, wherein the organic group optionally comprises one or more of a hydrogen atom, an oxygen atom, a nitrogen atom, a sulfur atom and a halogen atom. In some embodiments, $Q_1$ and $Q_2$ are individually a methylene group (—$CH_2$—). In some embodiments, $R_{26}$ to $R_{30}$ are individually a hydrogen atom or a C1-C6 alkyl group.

In some embodiments, the unsaturated C═C double bond-containing polyphenylene ether resin may comprise, but not limited to, a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a vinylbenzyl-containing polyphenylene ether resin with a number average molecular weight of about 2400 to 2800 (such as a vinylbenzyl-containing bisphenol A polyphenylene ether resin), a (meth)acryloyl-containing polyphenylene ether resin with a number average molecular weight of about 1900 to 2300 (such as SA9000, available from Sabic), a vinyl-containing polyphenylene ether resin with a number average molecular weight of about 2200 to 3000, or a combination thereof. The vinyl-containing polyphenylene ether resin may include various polyphenylene ether resins disclosed in the US Patent Application Publication No. 2016/0185904 A1, all of which are incorporated herein by reference in their entirety. The vinylbenzyl-containing polyphenylene ether resin may comprise, but not limited to, a vinylbenzyl-containing biphenyl polyphenylene ether resin, a vinylbenzyl-containing bisphenol A polyphenylene ether resin or a combination thereof.

The polyolefin used in the present disclosure is not particularly limited and may include any one or more olefin polymers useful for making a prepreg, a resin film, a laminate, or a printed circuit board, such as any one or more commercial products, products prepared by the applicant or a combination thereof.

Examples of the polyolefin disclosed herein include but are not limited to a diene polymer, a monoene polymer, a hydrogenated diene polymer or a combination thereof. The number average molecular weight generally ranges from 1000 to 150000. Because the polyolefin has a higher molecular weight and has a main chain containing regularly arranged carbon-carbon bonds, it has low molecular polarity which can lower the dielectric properties of the cured product.

In some embodiments, examples of the polyolefin include but are not limited to: polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. These components should be construed as including their modifications.

In some embodiments, the polyolefin is preferably a butadiene-based or an isoprene-based diene polymer, including but not limited to: polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer or a combination thereof.

In some embodiments, the styrene-butadiene copolymer comprises a styrene-butadiene block copolymer.

In some embodiments, the present disclosure uses the styrene-butadiene block copolymer D1118 available from Kraton and the polybutadiene B-1000 or B-3000 available from Nippon Soda.

In some embodiments, relative to 100 parts by weight of the unsaturated C═C double bond-containing polyphenylene ether resin, the amount of polyolefin may be 10 parts by weight to 50 parts by weight, 15 parts by weight to 25 parts by weight, 10 parts by weight to 25 parts by weight, or 25 parts by weight to 50 parts by weight.

In some embodiments, relative to 100 parts by weight of the unsaturated C═C double bond-containing polyphenylene ether resin, the amount of styrene-butadiene block copolymer may be 5 parts by weight to 25 parts by weight, and the amount of polybutadiene may be 5 parts by weight to 25 parts by weight.

The silica used herein may be any one or more silicas, all of which have an X-ray diffraction analysis pattern as measured by reference to JY/T 009-1996 containing only one diffraction peak in a 2θ ranging from 10° to 30°, and the diffraction peak has a full width at half maximum of 5.0° to 7.7°. Amorphous silica usually has only one diffraction peak in a 2θ ranging from 10° to 30°, but the diffraction peak has a full width at half maximum of greater than or equal to 7.8°. Crystalline silica has two diffraction peaks in a 2θ ranging from 10° to 30°, and the diffraction peaks have a full width at half maximum of less than or equal to 1°.

In some embodiments, different silicas are used in the present disclosure, and each silica has an X-ray diffraction analysis pattern in which only one corresponding diffraction peak exists in a 2θ ranging from 10° to 30°, and each diffraction peak has a full width at half maximum of 5.0° to 7.7°.

More specifically, the X-ray diffraction analysis pattern of the silica disclosed herein is measured by using an X-ray diffractometer of the model type Bruker D8ADVANCE (Germany) by reference to the processes described in JY/T 009-1996 "General rules for X-ray polycrystalline diffractometry".

The silica suitable for the present disclosure may comprise any one or more commercially available products, products prepared by the applicant (i.e., self-prepared products) or a combination thereof.

For example, the silica used herein may be a self-prepared product. The preparation method is not particularly limited and may be a chemical synthesis process in which the synthesis conditions are controlled to obtain the silica used herein.

For example, the silica may be purchased from Ginet New Materials Technology Co., Ltd. and Qichen New Material Technology Co., Ltd.

In some embodiments, relative to 100 parts by weight of the unsaturated C=C double bond-containing polyphenylene ether resin, the amount of silica may be 50 parts by weight to 130 parts by weight, such as 50 parts by weight to 80 parts by weight, or 80 parts by weight to 130 parts by weight.

The silica used herein may have any particle size, such as a particle size distribution of 0.01-15 μm, preferably a particle size distribution of 0.1-10 μm.

The silica used herein may be spherical, fibrous, plate-like, particulate, flake-like, whisker-like or a combination thereof, preferably spherical in shape, including solid spheres and hollow spheres.

The silica used herein may be optionally pretreated by a silane coupling agent. Silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. Preferably, the silica is surface-pretreated by vinyl silane, methacryloxy silane and acryloxy silane.

The silica used herein may be optionally modified by a molybdenum compound. Preferably, the molybdenum compound suitable for the present disclosure comprises, but not limited to, zinc molybdate, calcium molybdate, magnesium molybdate or a combination thereof.

Moreover, the resin composition may further optionally comprise an unsaturated C=C double bond-containing crosslinking agent; relative to 100 parts by weight of the unsaturated C=C double bond-containing polyphenylene ether resin, the unsaturated C=C double bond-containing crosslinking agent may be 5 parts by weight to 15 parts by weight.

The unsaturated C=C double bond-containing crosslinking agent used in the present disclosure is not particularly limited and may include any one or more unsaturated C=C double bond-containing crosslinking agents useful for making a prepreg, a resin film, a laminate, or a printed circuit board. For example, but not limited thereto, the unsaturated C=C double bond-containing crosslinking agent used herein may comprise 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof. These components should be construed as including their modifications.

The 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole and acrylate suitable for the present disclosure are not particularly limited and may comprise various commercially available products.

In addition to the aforesaid unsaturated C=C double bond-containing polyphenylene ether resin, polyolefin, silica and unsaturated C=C double bond-containing crosslinking agent, the resin composition disclosed herein may further optionally comprise maleimide resin, benzoxazine resin, epoxy resin, organic silicone resin, cyanate ester resin, active ester, phenolic resin, amine curing agent, polyamide, polyimide or a combination thereof. These components should be construed as including their modifications.

Unless otherwise specified, relative to 100 parts by weight of the unsaturated C=C double bond-containing polyphenylene ether resin, any component described above may range from 1 part by weight to 100 parts by weight, and the ratio therebetween can be adjusted according to the need. Preferably, relative to 100 parts by weight of the unsaturated C=C double bond-containing polyphenylene ether resin, the total amount of any component described above ranges from 5 parts by weight to 50 parts by weight.

The maleimide resin, benzoxazine resin, epoxy resin, organic silicone resin, cyanate ester resin, active ester, amine curing agent, polyamide and polyimide suitable for the present disclosure are not particularly limited and may include any one or more maleimide resins, benzoxazine resins, epoxy resins, organic silicone resins, cyanate ester resins, active esters, amine curing agents, polyamides and polyimides suitable for preparing a prepreg, a resin film, a laminate or a printed circuit board. They may comprise any one or more commercially available products, self-prepared products or a combination thereof.

The phenolic resin suitable for the present disclosure may comprise, but not limited to, mono-functional, bifunctional or multifunctional phenolic resin, comprising phenolic resin of a resin composition conventionally useful for making prepregs, such as phenol resin, phenoxy resin, novolac resin, etc. The novolac resin comprises phenol novolac resin, o-cresol novolac resin, and bisphenol A novolac resin.

In addition to the aforesaid components, the resin composition disclosed herein may optionally further comprise flame retardant, curing accelerator, polymerization inhibitor, solvent, silane coupling agent, surfactant, coloring agent, toughening agent or a combination thereof.

A suitable flame retardant may be any one or more flame retardants used for preparing a prepreg, a resin film, a laminate or a printed circuit board, including but not limited to a phosphorus-containing flame retardant or a bromine-containing flame retardant. For example, the phosphorus-containing flame retardant may include, but not limited to, ammonium polyphosphate, hydroquinone bis-(diphenyl phosphate), bisphenol A bis-(diphenylphosphate), tri(2-carboxy ethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO (9,10-dihydro-9-oxa-10-phospha-phenanthrene-10-oxide) and its derivatives (e.g., di-DOPO compound) or resins, DPPO (diphenylphosphine oxide) and its derivatives (e.g., di-DPPO compound) or resins, melamine cyanurate, tri-hydroxy ethyl isocyanurate, aluminium phosphinate (e.g., commercially available OP-930 and OP-935), or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, the amount of flame retardant used in the present disclosure may be adjusted according to the need; for example, but not limited thereto, relative to 100 parts by weight of the unsaturated C=C double bond-containing polyphenylene ether resin, the amount of flame retardant may be 1 to 100 parts by weight.

The curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis(4-t-butylcyclohexyl) peroxydicarbonate or a combination thereof.

Unless otherwise specified, in the present disclosure, the amount of curing accelerator may be adjusted according to the need; for example, but not limited thereto, relative to 100 parts by weight of the unsaturated C=C double bond-containing polyphenylene ether resin, the amount of curing accelerator may be 0.1 to 5.0 parts by weight and preferably 0.35 to 0.50 part by weight.

As used herein, the polymerization inhibitor is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof; more specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof. The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

Silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. The purpose of surfactant used herein is to ensure uniform distribution of the inorganic filler in the resin composition.

The coloring agent suitable for the present disclosure may comprise, but not limited to, dye or pigment.

Unless otherwise specified, the amount of polymerization inhibitor, silane coupling agent, surfactant and coloring agent used in the present disclosure may be adjusted according to the need; for example, but not limited thereto, relative to 100 parts by weight of the unsaturated C=C double bond-containing polyphenylene ether resin, the amount of any one aforesaid component may be 1 to 20 parts by weight.

The purpose of toughening agent used herein is to improve the toughness of the resin composition. The toughening agent may comprise, but not limited to, carboxyl-terminated butadiene acrylonitrile rubber (CTBN rubber).

Unless otherwise specified, the amount of toughening agent used in the present disclosure may be adjusted according to the need; for example, but not limited thereto, relative to 100 parts by weight of the unsaturated C=C double bond-containing polyphenylene ether resin, the amount of toughening agent may be 5 to 50 parts by weight.

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 120° C. to 180° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

In one embodiment, by well mixing the resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and an insulation layer disposed between the metal foils, wherein the insulation layer is made by curing the resin composition at high temperature and high pressure to the C-stage, a suitable curing temperature being for example between 190° C. to 220° C. and preferably between 200° C. to 210° C. and a suitable curing time being 90 to 180 minutes and preferably 120 to 150 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

In one embodiment of making the printed circuit board according to the present disclosure, a double-sided copper-clad laminate (such as product EM-827, available from Elite Material Co., Ltd.) with a thickness of 28 mil and having a 1-ounce (oz) HTE (high temperature elongation) copper foil may be used and subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly containing a copper foil, the prepreg, the inner layer circuit board, the prepreg and a copper foil stacked in said order by heating at 190 to 220° C. for 90 to 180 minutes to cure the insulation material of the prepregs. Next, black oxidation, drilling, copper plating and other known circuit board processes are performed on the outmost copper foils so as to obtain the printed circuit board.

In one or more embodiments, the resin composition of the present disclosure and various articles made therefrom may preferably have any one, more or all of the following properties.

In one embodiment, a dissipation factor at 10 GHz as measured by reference to JIS C2565 is less than or equal to 0.0039, such as between 0.0033 and 0.0039.

In one embodiment, the article is absent of void in an open area as observed from a resin filling property test of the open area.

In one embodiment, a prepreg made from the resin composition is superimposed on both sides of the brown oxide treated inner layer wiring board and then subject to lamination and curing to obtain a sample for the resin filling property test of open area, which is absent of void in the open area under the observation using a microscope.

In one embodiment, a hole drilling limit value as measured from a drilling capability test is greater than or equal to 10000, such as between 10000 and 17000.

In one embodiment, a copper-containing laminate is obtained by laminating a copper foil, 12 prepregs made from the resin composition and a copper foil stacked in said order; two copper-containing laminates are stacked and then drilled by a drilling machine at a speed of 195 krmp using a new drill bit (blade length 3.5 mm and diameter 0.15 mm). A hole drilling limit value is defined as the number of holes drilled when the wear percentage of the drill bit blade reaches 70%, and the hole drilling limit value in one embodiment is greater than or equal to 10000, such as between 10000 and 17000.

In one embodiment, a precision of hole position Cpk as measured from a drilling precision test is greater than or equal to 1.33, such as between 1.34 and 1.82.

In one embodiment, a copper-containing laminate is obtained by laminating a copper foil, 12 prepregs made from the resin composition and a copper foil stacked in said order; two copper-containing laminates are stacked and then drilled by a drilling machine at a speed of 195 krmp using a new drill bit (blade length 3.5 mm and diameter 0.15 mm) to form 3000 holes; with the central shift of the drilled holes controlled at ±40 μm, the process capability index (precision of hole position Cpk) in one embodiment is greater than or equal to 1.33.

Raw materials below were used to prepare the resin compositions of various Examples (Table 1) and Comparative Examples (Table 2) of the present disclosure and further fabricated to prepare test samples or articles.

The names of reagents used in the Examples and Comparative Examples are as follows:

1. methacryloyl-containing polyphenylene ether resin: product name SA9000, available from Sabic.
2. vinylbenzyl-containing polyphenylene ether resin: product name OPE-2st 1200, available from Mitsubishi Gas Chemical Co., Inc.
3. vinylbenzyl-containing polyphenylene ether resin: product name OPE-2st 2200, available from Mitsubishi Gas Chemical Co., Inc.
4. polybutadiene: product name B-1000, number average molecular weight (Mn) of about 1200, available from Nippon Soda Co., Ltd.
5. polybutadiene: product name B-3000, number average molecular weight (Mn) of about 3200, available from Nippon Soda Co., Ltd.
6. styrene-butadiene block copolymer: product name D1118, a mixture of styrene-butadiene-styrene triblock copolymer and styrene-butadiene diblock copolymer, number average molecular weight (Mn) of about 100000, available from Kraton.
7. triallyl isocyanurate: product name TAIC, available from Kingyorker Enterprise Co., Ltd.
8. 1,2-bis(vinylphenyl)ethane: product name BVPE, available from Linchuan Chemical Co., Ltd.
9. divinylbenzene: product name DVB, available from Sigma Aldrich.
10. silica A1: solid sphere, D90=1 to 3 μm, not surface-treated with silane coupling agent, only one diffraction peak in a 2θ ranging from 10° to 30° in the X-ray diffraction analysis pattern, full width at half maximum of the diffraction peak being 6.8° to 7.5°, available from Ginet New Materials Technology Co., Ltd.
11. silica A2: solid sphere, D90=1 to 3 μm, surface-treated with methacryloxy silane coupling agent, only one diffraction peak in a 2θ ranging from 10° to 30° in the X-ray diffraction analysis pattern, full width at half maximum of the diffraction peak being 7.2° to 7.3°, available from Ginet New Materials Technology Co., Ltd.
12. silica A3: solid sphere, D90=8.5 to 10 μm, only one diffraction peak in a 2θ ranging from 10° to 30° in the X-ray diffraction analysis pattern, full width at half maximum of the diffraction peak being 7.3° to 7.7°, available from Ginet New Materials Technology Co., Ltd.
13. silica A4: hollow sphere, D90=4 to 7 μm, only one diffraction peak in a 2θ ranging from 10° to 30° in the X-ray diffraction analysis pattern, full width at half maximum of the diffraction peak being 5.2° to 7.6°, available from Qichen New Material Technology Co., Ltd.
14. amorphous silica: product name SC2500-SVJ, solid sphere, D90≤3 μm, only one diffraction peak in a 2θ ranging from 10° to 30° in the X-ray diffraction analysis pattern, full width at half maximum of the diffraction peak being 7.8° to 9.0°, available from Admatechs.
15. amorphous silica: product name SC2050-MB, solid sphere, D90≤3 μm, 50% to 70% MEK slurry, only one diffraction peak in a 2θ ranging from 10° to 30° in the X-ray diffraction analysis pattern, full width at half maximum of the diffraction peak being 7.8° to 9.0°, available from Admatechs.
16. amorphous silica: product name SO25R, solid sphere, D90≤3 μm, only one diffraction peak in a 2θ ranging from 10° to 30° in the X-ray diffraction analysis pattern, full width at half maximum of the diffraction peak being 7.8° to 9.0°, available from Admatechs.
17. amorphous silica: product name SFP-30R, solid sphere, D90≤3 μm, only one diffraction peak in a 2θ ranging from 10° to 30° in the X-ray diffraction analysis pattern, full width at half maximum of the diffraction peak being 8.8° to 8.9°, available from Denka.
18. amorphous silica: product name 525 (a.k.a. fused $SiO_2$), irregular flake, D90≤7 μm, only one diffraction peak in a 2θ ranging from 10° to 30° in the X-ray diffraction analysis pattern, full width at half maximum of the diffraction peak being 7.8° to 7.9°, available from Sibelco.
19. crystalline silica: D90≤14 μm, only two diffraction peaks in a 2θ ranging from 10° to 30°, full width at half maximum of both diffraction peaks being 0.01° to 1°, available from Sibelco.
20. curing accelerator: 2,5-dimethyl-2,5-di(t-butylperoxy)-3-hexyne, product name 25B, available from NOF Corporation.
21. solvent: toluene, available from Sinopec Group.

A proper amount (abbreviated as "PA") in Tables 1-2 represents an amount of solvent suitable for obtaining a desired solid content for the resin composition, such as a solid content of the varnish in Tables 1-2 being 65 wt %.

For the property tests of Examples E1 to E8 and Comparative Examples C1 to C7 listed in Table 1 and Table 2, samples (specimens) were prepared as described below and tested under specified conditions as follows.

1. Prepreg: Resin composition from each Example (Table 1) or each Comparative Example (Table 2) was individually well-mixed to form a varnish, which was then loaded to an impregnation tank; a fiberglass fabric (e.g., 2116 E-glass fiber fabric, 1078 E-glass fiber fabric, 1067 E-glass fiber fabric or 1027 E-glass fiber fabric, all available from Asahi) was impregnated into the impregnation tank to adhere the resin composition onto the fiberglass fabric, followed by heating at 150° C. to 170° C. to B-stage to obtain a prepreg.

2. Copper-free laminate (2-ply, formed by lamination of two prepregs): Two 18 μm HTE (high temperature elongation) copper foils and two prepregs obtained from 1067 E-glass fiber fabrics impregnated with each Example or Comparative Example were prepared and stacked in the order of one copper foil, two prepregs and one copper foil, followed by lamination under vacuum at 420 psi and 200° C. for 2 hours to form a copper-containing laminate (2-ply, formed by lamination of two prepregs). Next, each copper-clad laminate was etched to remove the copper foils on both sides to obtain a copper-free laminate (2-ply) which is formed by laminating two prepregs and has a solid content of the resin composition (excluding solvent) of about 71%.

3. Copper-containing laminate (12-ply, formed by lamination of twelve prepregs): Two 12 μm RTFs (reverse treated copper foils) and twelve prepregs obtained from 2116 E-glass fiber fabrics impregnated with each Example or Comparative Example were prepared and stacked in the order of one copper foil, twelve prepregs and one copper foil, followed by lamination under vacuum at 420 psi and 200° C. for 2 hours to form a copper-containing laminate (12-ply, formed by lamination of twelve prepregs).

Each sample was analyzed as described below.

1. Dissipation Factor (Df)

In the dissipation factor measurement, the copper-free laminate (2-ply) sample was tested by using a microwave dielectrometer available from AET Corp. by reference to JIS C2565 "Measuring methods for ferrite cores for microwave device" at 10 GHz for analyzing each sample. Lower dissipation factor represents better dielectric properties of the sample. Under a 10 GHz frequency, for a Df value of less than 0.005, a difference in Df of less than 0.0001 represents no substantial difference in dissipation factor in different laminates, and a difference in Df value of greater than or equal to 0.0001 represents a substantial difference (i.e., significant technical difficulty) in dissipation factor in different laminates.

2. Resin Filling Property in Open Area

First, a core was prepared as follows: a prepreg (using a 1078 E-glass fiber fabric, solid content of the resin composition excluding solvent about 64%) prepared from each Example (E1 to E8) or each Comparative Example (C1 to C7) was superimposed on both sides with a piece of 18 μm HTE copper foil, followed by lamination and curing for 2 hours under vacuum at high temperature (200° C.) and high pressure (420 psi) to obtain a copper-clad core.

The copper-clad core was subject to conventional inner layer trace processes according to the Gerber Format Specification. First, the copper-clad core was treated by surface roughening on the copper foils by grinding and micro-etching, and then a photoresist dry film was tightly attached to the copper-clad core with proper temperature and pressure conditions. The core attached with the photoresist dry film was exposed in a UV exposure machine, during which the photoresist performed polymerization after UV radiation on the transparent area of the artwork (the dry film at the area was preserved as etching resist in the subsequent development and copper etching steps), so as to transfer the trace image on the artwork to the photoresist dry film. The protective membrane on the film was torn down, and the area not subject to radiation on the film was removed by a sodium bicarbonate solution, followed by etching off the exposed copper foil with a mixture solution of hydrochloric acid and hydrogen peroxide so as to form traces and an open area. Then a sodium hydroxide solution was used to wash off the photoresist dry film to obtain an inner layer wiring board. The inner layer wiring board was subject to a brown oxidation process to obtain a brown oxide treated inner layer wiring board, which had an insulation layer of 2.5 mil in thickness.

Figure 2:
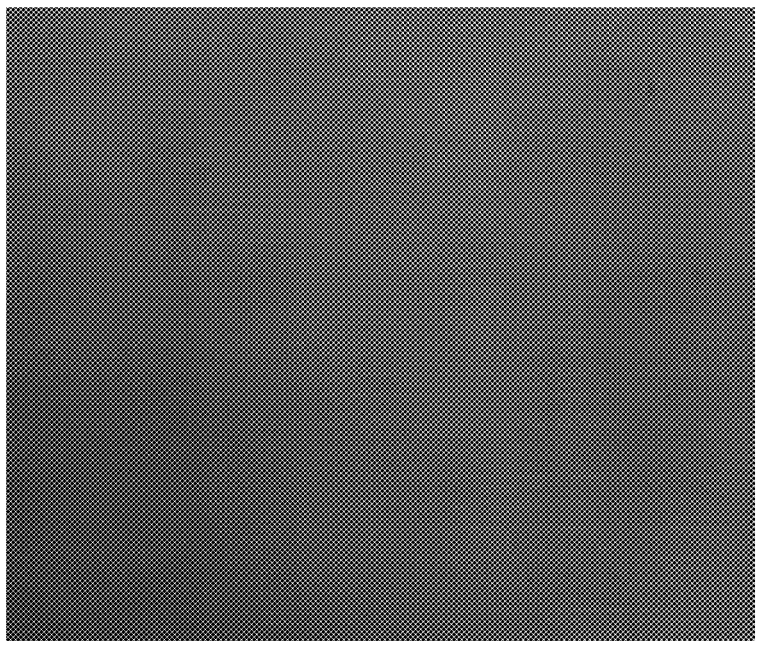
FIG. 2 illustrates the absence of void in the open area.

A prepreg (prepared from each of Examples E1 to E8 or each of Comparative Examples C1 to C7 using a 1027 E-glass fiber fabric, solid content of the resin composition excluding solvent about 69%, the prepreg thickness being 1.5 mil) was superimposed on both sides of the brown oxide treated inner layer wiring board, and the other side of each prepreg opposite to the brown oxide treated inner layer wiring board was covered with a piece of 18 μm HTE copper foil, followed by lamination and curing for 2 hours under vacuum at high temperature (200° C.) and high pressure (420 psi) to obtain a copper-clad multi-layer board. The copper foils on the copper-clad multi-layer board were removed such as by etching to obtain a sample for the resin filling property test of open area. A 10× optical microscope was used to observe the open area of the sample for the resin filling property test of open area to determine the presence or absence of void in the open area. A designation "void" is given to represent presence of void (see FIG. 1), and a designation "OK" is given to represent absence of void in the open area (see FIG. 2). Presence of void in the open area indicates poor resin filling property.

3. Hole Drilling Limit Value

Two copper-containing laminate (12-ply) samples were stacked and subject to the drilling capability test as described below. A new drill bit (blade length 3.5 mm and diameter 0.15 mm, model type Z699MWU, available from Taiwan Union Tool Corp.) was chosen and used in a drilling machine (model type HITACHI ND-6Ni210E, available from Taiwan Union Tool Corp.) for drilling at a speed of 195 krmp; after every 500 holes were drilled, the drill bit was removed and observed with a microscope to determine the wear degree of the drill bit blade; the hole drilling limit value is defined as the number of holes drilled when the wear percentage of the drill bit blade reaches 70%. Greater hole drilling limit value represents better drilling processability of the material.

4. Precision of Hole Position Cpk

Two copper-containing laminate (12-ply) samples were stacked and subject to the drilling precision test as described below. A new drill bit (blade length 3.5 mm and diameter 0.15 mm, model type Z699MWU, available from Taiwan Union Tool Corp.) was chosen and used in a drilling machine (model type HITACHI ND-6Ni210E, available from Taiwan Union Tool Corp.) for drilling 3000 holes at a speed of 195 krmp; central shift of each drilled hole was observed with a microscope to determine the deviation of hole position, a central shift of hole position of ±40 μm was considered as acceptable, and with the central shift of the drilled hole controlled at ±40 μm, the process capability index was calculated, abbreviated as precision of hole position Cpk. A precision of hole position Cpk≥1.33 is acceptable, and a higher precision of hole position Cpk represents a higher drilling precision and a more stable quality. A precision of hole position Cpk<1.33 is unacceptable, representing higher central shift deviation of hole position, lower drilling precision and unstable quality.

TABLE 1

Resin compositions of Examples E1 to E8 (in part by weight)

| | Composition | E1 | E2 | E3 | E4 | E5 | E6 | E7 | E8 |
|---|---|---|---|---|---|---|---|---|---|
| (A) unsaturated C=C double bond-containing polyphenylene ether | SA9000 | 100 | 100 | 100 | 100 | 100 | 100 | 100 | 85 |
| | OPE-2st 1200 | | | | | | | | 10 |
| | OPE-2st 2200 | | | | | | | | 5 |
| (B) polyolefin | B-1000 | 17 | 17 | 17 | 17 | 5 | 17 | 17 | 15 |
| | B-3000 | | | | | | | | 10 |
| | D1118 | 8 | 8 | 8 | 8 | 5 | 8 | 8 | 25 |
| unsaturated C=C double bond-containing crosslinking agent | TAIC | | | | | 15 | | | 2 |
| | BVPE | | | | | | | | 2 |
| | DVB | | | | | | | | 1 |
| (C) silica | A1 | 80 | | | | | 130 | 50 | 10 |
| | A2 | | 80 | | | | | | 10 |
| | A3 | | | 80 | | | | | |
| | A4 | | | | 80 | 80 | | | 60 |
| curing accelerator | 25B | 0.5 | 0.5 | 0.5 | 0.5 | 0.5 | 0.5 | 0.5 | 0.35 |
| solvent | toluene | PA | PA | PA | PA | PA | PA | PA | PA |
| X-ray diffraction peak of silica | type of silica | A1 | A2 | A3 | A4 | A4 | A1 | A1 | A1 A2 A4 |
| | FWHM of diffraction peak from 10° to 30° | 6.8°-7.5° | 7.2°-7.3° | 7.3°-7.7° | 5.2°-7.6° | 5.2°-7.6° | 6.8°-7.5° | 6.8°-7.5° | 6.8°-7.5° 7.2°-7.3° 5.2°-7.6° |
| | number of diffraction peak from 10° to 30° | 1 | 1 | 1 | 1 | 1 | 1 | 1 | 1 1 1 |

TABLE 2

Resin compositions of Comparative Examples C1 to C7 (in part by weight)

| Composition | | C1 | C2 | C3 | C4 | C5 | C6 | C7 |
|---|---|---|---|---|---|---|---|---|
| (A) unsaturated C=C double bond-containing polyphenylene ether | SA9000 | 100 | 100 | 100 | 100 | 100 | 100 | 100 |
| | OPE-2st 1200 | | | | | | | |
| | OPE-2st 2200 | | | | | | | |
| (B) polyolefin | B-1000 | 17 | 17 | 17 | 17 | 17 | 17 | 17 |
| | B-3000 | | | | | | | |
| | D1118 | 8 | 8 | 8 | 8 | 8 | 8 | 8 |
| amorphous silica | SC2500-SVJ | 80 | | | | | | |
| | SC2050-MB | | 80 | | | | | |
| | SO25R | | | 80 | | | | |
| | SFP-30R | | | | 80 | | | |
| | 525 | | | | | 80 | | 40 |
| | crystalline silica | | | | | | 80 | 40 |
| curing accelerator | 25B | 0.5 | 0.5 | 0.5 | 0.5 | 0.5 | 0.5 | 0.5 |
| solvent | toluene | PA | PA | PA | PA | PA | PA | PA |
| X-ray diffraction peak of silica | type of silica | SC2500-SVJ | SC2050-MB | SO25R | SFP-30 R | 525 | crystalline silica | 525 crystalline silica |
| | FWHM of diffraction peak from 10° to 30° | 7.8°–9.0° | 7.8°–9.0° | 7.8°–9.0° | 8.8°–8.9° | 7.8°–7.9° | 0.01°–1.0° | 7.8°–7.9° 0.01°–1.0° |
| | number of diffraction peak from 10° to 30° | 1 | 1 | 1 | 1 | 1 | 2 | 2 |

TABLE 3

Test results of articles made from resin compositions of Examples E1 to E8

| Property | Unit | E1 | E2 | E3 | E4 | E5 | E6 | E7 | E8 |
|---|---|---|---|---|---|---|---|---|---|
| Df | / | 0.0038 | 0.0038 | 0.0036 | 0.0035 | 0.0037 | 0.0033 | 0.0039 | 0.0037 |
| resin filling property in open area | / | OK | OK | OK | OK | OK | OK | OK | OK |
| hole drilling limit value | / | 12000 | 12000 | 10000 | 14000 | 15000 | 10000 | 15000 | 17000 |
| precision of hole position Cpk | / | 1.40 | 1.42 | 1.35 | 1.68 | 1.82 | 1.34 | 1.58 | 1.80 |

TABLE 4

Test results of articles made from resin compositions of Comparative Examples C1 to C7

| Property | Unit | C1 | C2 | C3 | C4 | C5 | C6 | C7 |
|---|---|---|---|---|---|---|---|---|
| Df | / | 0.0041 | 0.0041 | 0.0041 | 0.0042 | 0.0043 | 0.0044 | 0.0043 |
| resin filling property in open area | / | void | ok | void | void | void | void | void |
| hole drilling limit value | / | 9500 | 9500 | 9500 | 9500 | 8500 | 5000 | 7500 |
| precision of hole position Cpk | / | 1.31 | 1.30 | 1.29 | 1.28 | 1.08 | 0.93 | 1.01 |

The following observations can be made from Table 1 to Table 4.

Examples E1 to E4 containing 50 parts by weight to 130 parts by weight of the silica according to the present disclosure as the inorganic filler in the resin composition, wherein only one diffraction peak exists in a 2θ ranging from 10° to 30° and the full width at half maximum is 5.0° to 7.7°, in contrast to Comparative Examples C1 to C5 using amorphous silica as the inorganic filler, wherein only one diffraction peak exists in a 2θ ranging from 10° to 30° and the full width at half maximum is 7.8° or greater, have lower dissipation factor, significantly improve hole drilling limit value and precision of hole position Cpk and therefore have a better drilling processability. In addition, Examples E1 to E4 are absent of void in an open area and therefore have a better resin filling property in open area.

Examples E1 to E4 containing 50 parts by weight to 130 parts by weight of the silica according to the present disclosure as the inorganic filler in the resin composition, wherein only one diffraction peak exists in a 2θ ranging from 10° to 30° and the full width at half maximum is 5.0° to 7.7°, in contrast to Comparative Example C6 using crystalline silica as the inorganic filler, wherein two diffraction peaks exist in a 2θ ranging from 10° to 30° and the full width at half maximum is 1.0° or lower, have lower dissipation factor, significantly improve hole drilling limit value and precision of hole position Cpk and therefore have a better drilling processability. In addition, Examples E1 to E4 are absent of void in an open area and therefore have a better resin filling property in open area.

On the other hand, it is observed that Examples E1 to E8, which use silica having only one diffraction peak in a 2θ ranging from 10° to 30° and a full width at half maximum of 5.0° to 7.7°, in contrast to Comparative Example C7 using a 40:40 mixture of crystalline silica and amorphous silica as the inorganic fillers, apparently have lower dissipation factor, significantly improve hole drilling limit value and precision of hole position Cpk and therefore have a better drilling processability. In addition, Examples E1 to E8 are absent of void in an open area and therefore have a better resin filling property in open area.

In addition to containing 50 parts by weight to 130 parts by weight of the silica according to the present disclosure as the inorganic filler, wherein only one diffraction peak exists in a 2θ ranging from 10° to 30° and the full width at half maximum is 5.0° to 7.7°, Examples E5 and E8, which further contain an unsaturated C═C double bond-containing crosslinking agent, in contrast to Examples E1 to E4 and E6 not containing an unsaturated C═C double bond-containing crosslinking agent, may achieve desirable dielectric properties and resin filling property in open area, and at the same time the hole drilling limit value and precision of hole position Cpk are further improved, therefore having an even better drilling processability.

Example E6, which contains 130 parts by weight of the silica according to the present disclosure as the inorganic filler, in contrast to Example E1, which contains 80 parts by weight of the silica according to the present disclosure as the inorganic filler, can achieve a lower dissipation factor and therefore have a better dielectric properties in addition to the high hole drilling limit value and precision of hole position Cpk, absence of void in the open area and therefore have a desirable drilling processability and resin filling property in open area.

Example E7, which contains 50 parts by weight of the silica according to the present disclosure as the inorganic filler, in contrast to Example E1, which contains 80 parts by weight of the silica according to the present disclosure as the inorganic filler, can further improve the hole drilling limit value and precision of hole position Cpk and therefore have a better drilling processability in addition to the low dissipation factor and absence of void in the open area, which represent desirable dielectric properties and resin filling property in open area.

The above detailed description is merely illustrative in nature and is not intended to limit the embodiments of the subject matter or the applications and uses of such embodiments. As used herein, the term "exemplary" or similar expression means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments and equivalents thereof. Also, the scope defined by the claims includes known equivalents and foreseeable equivalents at the time of filing this patent application.

What is claimed is:

1. A resin composition, comprising:
   (A) 100 parts by weight of an unsaturated C═C double bond-containing polyphenylene ether resin;
   (B) 10 parts by weight to 50 parts by weight of a polyolefin; and
   (C) 50 parts by weight to 130 parts by weight of silica, wherein, in an X-ray diffraction analysis pattern as measured by reference to JY/T 009-1996 of the silica, only one diffraction peak exists in a 2θ ranging from 10° to 30°, and the diffraction peak has a full width at half maximum of 5.0° to 7.7°.

2. The resin composition of claim 1, wherein the unsaturated C═C double bond-containing polyphenylene ether resin comprises a vinylbenzyl-containing polyphenylene ether resin, a (meth)acryloyl-containing polyphenylene ether resin, a vinyl-containing polyphenylene ether resin or a combination thereof.

3. The resin composition of claim 1, wherein the polyolefin comprises polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, styrene-maleic anhydride copolymer, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

4. The resin composition of claim 1, further comprising 5 parts by weight to 15 parts by weight of an unsaturated C═C double bond-containing crosslinking agent.

5. The resin composition of claim 4, wherein the unsaturated C═C double bond-containing crosslinking agent comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

6. The resin composition of claim 1, further comprising maleimide resin, benzoxazine resin, epoxy resin, organic silicone resin, cyanate ester resin, active ester, phenolic resin, amine curing agent, polyamide, polyimide or a combination thereof.

7. The resin composition of claim 1, further comprising flame retardant, curing accelerator, polymerization inhibitor, solvent, silane coupling agent, surfactant, coloring agent, toughening agent or a combination thereof.

8. An article made from the resin composition of claim 1, wherein the article comprises a prepreg, a resin film, a laminate, or a printed circuit board.

9. The article of claim 8, having a dissipation factor at 10 GHz as measured by reference to JIS C2565 of less than or equal to 0.0039.

10. The article of claim 8, characterized by absence of void in an open area as observed from a resin filling property test of the open area.

11. The article of claim 8, having a hole drilling limit value as measured from a drilling capability test of greater than or equal to 10000.

12. The article of claim 8, having a precision of hole position Cpk as measured from a drilling precision test of greater than or equal to 1.33.

\* \* \* \* \*